UNITED STATES PATENT OFFICE.

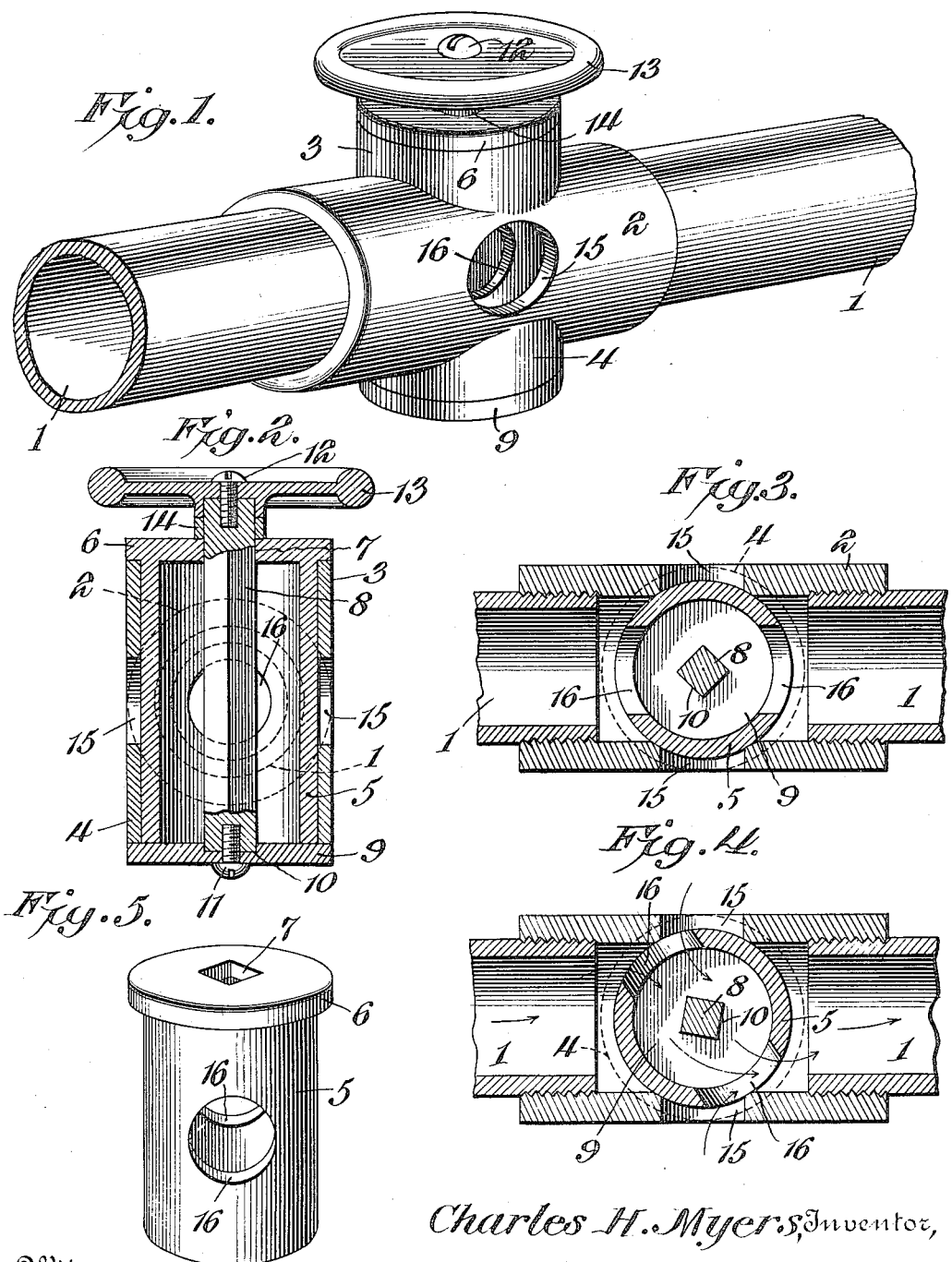

CHARLES H. MYERS, OF BUFFALO, NEW YORK.

MIXER.

1,075,599.　　　　Specification of Letters Patent.　　Patented Oct. 14, 1913.

Application filed February 24, 1910, Serial No. 545,779. Renewed March 8, 1913. Serial No. 753,076.

*To all whom it may concern:*

Be it known that I, CHARLES H. MYERS, a citizen of the United States, residing at Buffalo, in the county of Erie and State of New York, have invented a new and useful Mixer, of which the following is a specification.

This invention relates to devices for mixing air and gas before the admission of the same to the combustion chamber of an explosive engine, and the object of the invention is to provide a device of cheap and simple construction, by which the mixture of the air and gas may be readily controlled and the proper proportion of each admitted to the engine.

The object of the invention is attained in the use of the device illustrated in the accompanying drawings, and the invention consists in certain novel features thereof which will be hereinafter fully described and claimed.

In the drawings, Figure 1 is a perspective view of my improved air and gas mixer. Fig. 2 is a diametrical vertical section of the same. Fig. 3 is a horizontal section of the device showing it arranged to cut off the flow of air. Fig. 4 is a similar view showing the device arranged to admit equal quantities of air and gas to the engine. Fig. 5 is a detail perspective view of the rotary cylinder or cut-off valve.

The pipe 1 may be of any desired arrangement or capacity and leads directly into the combustion chamber of the engine from the carbureter. Adjacent the engine I interpose within the pipe 1 a coupling 2 having upstanding and depending bosses 3 and 4 on its upper and lower sides, respectively. These bosses form a substantially vertical cylinder, as shown most clearly in Fig. 2, and within the said bosses and the body of the coupling I rotatably mount a cylindrical valve 5 having an open lower end and provided with an enlarged cylindrical head or flange 6 at its upper end. The said head 6 is formed with a central angular opening 7 adapted to be engaged by a stem 8, and the said stem is of a cross-sectional contour corresponding to that of the angular opening 7, whereby rotation of the stem will cause a rotation of the valve and, consequently, permit the valve to be easily adjusted to the proper position. A plate or cap 9 is provided at the lower end of the valve and this cap 9 is provided with a central recess or seat 10 which receives the lower end of the stem 8, the plate or cap fitting closely against the lower end of the valve and the edge of the depending boss 4, as clearly shown in Figs. 1 and 2. A screw 11 is inserted through the plate or cap 9 into the end of the stem to firmly secure the plate and stem together, and a similar screw 12 is employed to secure a hand-wheel 13 on the upper end of the stem, as will be readily understood. The hub of the hand-wheel 13 may extend to the top of the valve, but I prefer to interpose a washer 14 between the said hub and the top of the valve, as shown in Fig. 2.

In the opposite sides of the coupling 2, I form ports 15 which communicate with the atmosphere, and in the side walls of the valve 5, I provide the diametrically-opposite ports 16 which are of substantially the same area as and are adapted to register more or less with the air ports 15 to admit air to the pipe 1 or to cut off the same, as will be readily understood on reference to Figs. 3 and 4.

When the valve is in the position shown in Fig. 3 carbureted air coming from a suitable source of supply will pass directly through the valve to the engine without any admixture of atmospheric air at the valve. When the valve is turned ninety degrees from the position shown in Fig. 3 communication between the source of carbureted air and the engine is cut off, nor is the engine connected with the atmosphere through the valve. When the valve is turned from the position shown in Fig. 3 until the ports 16 begin to open to the ports 15, then atmospheric air will flow through one of the ports 15 and the matching port 16 into the interior of the valve, where the flow will become somewhat sluggish due to the size of the interior of the valve, which is greater than the cross section of either pipe 1, and consequently the interior of the valve acts as a mixing chamber for the enriched or carbureted air or gas and whatever air is drawn through the ports 15 and 16 on the supply side of the valve. At the same time, however, the port 16 on the other side of the valve has been brought into like relation with the port 15 of said other side of the valve, and consequently the diluted mixture within the valve 5 is further diluted with air entering through the second named port 15 and passing to the pipe 1 leading to the engine. This admixture of air with the fuel mixture coming to the valve may be regulated at will by turning the valve, but a progressive movement of the valve will tend to throttle the port 15 on the outlet side of the valve, so that the fuel mixture going to the engine is thereby regulated at the will of the operator. By this means very sensitive regulation is afforded both as to the dilution of the fuel with air and the quantity of fuel permitted to pass to the engine, and all this is performed by the act of turning the valve 5 to a greater or less extent about its longitudinal axis.

The device is exceedingly simple in its construction and can be manufactured at a trifling cost and may be fitted to any engine without involving any modification of the engine or re-arrangement of any of its parts. Should it be necessary to clean the valve, the disengagement of the screw 11 will permit the parts to be separated so that access may be had to all of the same and the assembling of the parts in fitting the valve to the engine may be as easily accomplished.

Having thus described the invention, what I claim as new, and desire to secure by Letters Patent, is:—

1. A mixer comprising a body member provided with alined passages and an intermediate valve casing with oppositely disposed ports therethrough on a line perpendicular to the alined passages and communicating with the atmosphere, and a hollow valve adapted to the valve casing and provided with oppositely disposed ports each of less diameter than the inner diameter of the valve and communicating one with the other through the hollow interior of the valve, said valve being movable at will to bring the ports and the passages through the body member into operative relation simultaneously to any desired extent.

2. The combination of a body member having oppositely disposed means for coupling pipes thereto and provided at an intermediate point with a valve casing having oppositely disposed ports therethrough on a line at right angles to the line of the pipe connecting means, a hollow cylindrical valve rotatably mounted in the valve casing and provided with diametrically opposite ports opening into the interior of the valve and adapted to register with the ports in the valve casing or the ends of the body member adapted to receive pipes, or with both at will, the said valve being provided with a head adapted to engage one end of the valve casing, a stem extending through and having an angular engagement with the head of the valve, a cap secured to the lower end of the stem, and bearing against the corresponding end of the valve and casing, and means on the stem for rotating the valve.

In testimony, that I claim the foregoing as my own, I have hereto affixed my signature in the presence of two witnesses.

CHARLES H. MYERS.

Witnesses:
JOHN H. SIGGERS,
DAVID R. WAGNER.